United States Patent
Kuwahara et al.

(10) Patent No.: US 10,836,452 B2
(45) Date of Patent: Nov. 17, 2020

(54) FRONT FORK FOR SADDLED VEHICLE

(71) Applicant: HONDA MOTOR CO., LTD., Tokyo (JP)

(72) Inventors: Naoki Kuwahara, Wako (JP); Masayuki Fujita, Wako (JP); Kenji Tako, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 334 days.

(21) Appl. No.: 15/756,643

(22) PCT Filed: Aug. 3, 2016

(86) PCT No.: PCT/JP2016/072742
§ 371 (c)(1),
(2) Date: Mar. 1, 2018

(87) PCT Pub. No.: WO2017/051614
PCT Pub. Date: Mar. 30, 2017

(65) Prior Publication Data
US 2018/0244336 A1 Aug. 30, 2018

(30) Foreign Application Priority Data
Sep. 25, 2015 (JP) .................................. 2015-188547

(51) Int. Cl.
*B62K 21/02* (2006.01)
*B62K 19/12* (2006.01)
(Continued)

(52) U.S. Cl.
CPC ................ *B62K 21/02* (2013.01); *B62J 6/20* (2013.01); *B62K 19/30* (2013.01); *B62K 19/40* (2013.01);
(Continued)

(58) Field of Classification Search
CPC ...... B62J 6/20; B62L 1/00; B62L 1/02; B62K 3/02; B62K 19/12; B62K 19/30;
(Continued)

(56) References Cited

U.S. PATENT DOCUMENTS

2002/0014756 A1* 2/2002 Fujii ........................ B62L 1/00
280/274
2003/0067782 A1* 4/2003 Niezrecki ................. B62J 6/20
362/473

(Continued)

FOREIGN PATENT DOCUMENTS

DE 20106106 * 6/2001
JP 2011-121435 6/2011
(Continued)

OTHER PUBLICATIONS

International Preliminary Report on Patentability dated Apr. 5, 2018 (Apr. 5, 2018), 6 pages.
(Continued)

*Primary Examiner* — Kevin Hurley
*Assistant Examiner* — Maurice L Williams
(74) *Attorney, Agent, or Firm* — Rankin, Hill & Clark LLP

(57) ABSTRACT

A front fork capable of reducing an unsprung weight of the arm-shaped front fork, optimizing rigidity, and improving appearance is provided. A front swing arm includes a left and right arm portions, and a bridge portion integrally connecting the left and right arm portions, a first lightening hole, a second lightening hole and a third lightening hole are provided in the arm portion, the first lightening hole, the second lightening hole and the third lightening hole are covered with a reflector provided to be exposed to an outer side surface of the arm portion from outside.

7 Claims, 10 Drawing Sheets

(51) Int. Cl.
    *B62K 19/30*     (2006.01)
    *B62K 19/38*     (2006.01)
    *B62K 19/40*     (2006.01)
    *B62K 25/24*     (2006.01)
    *B62L 1/00*     (2006.01)
    *B62J 6/20*     (2006.01)

(52) U.S. Cl.
    CPC ............... B62K 25/24 (2013.01); B62L 1/00 (2013.01); *B62K 19/12* (2013.01); *B62K 19/38* (2013.01); *B62K 2201/02* (2013.01)

(58) Field of Classification Search
    CPC ........ B62K 19/38; B62K 19/40; B62K 21/02; B62K 25/24; B62K 2201/02
    See application file for complete search history.

(56) References Cited

U.S. PATENT DOCUMENTS

| | | | | |
|---|---|---|---|---|
| 2004/0007848 A1* | 1/2004 | Sinyard | ................ | B62K 19/16 280/279 |
| 2004/0026890 A1* | 2/2004 | Cobb | ................ | B62K 21/02 280/276 |
| 2005/0248119 A1* | 11/2005 | Callahan | ................ | B62K 21/02 280/279 |
| 2007/0222178 A1* | 9/2007 | Davis | ................ | B62K 19/16 280/281.1 |
| 2008/0023934 A1* | 1/2008 | van Houweling | ......... | B62J 6/02 280/276 |
| 2008/0169149 A1* | 7/2008 | Holroyd | ................ | B62K 11/06 180/227 |
| 2008/0203700 A1* | 8/2008 | Tseng | ................ | B62K 3/04 280/283 |
| 2008/0236923 A1* | 10/2008 | Hasegawa | ............ | B62K 21/005 180/219 |
| 2008/0252038 A1* | 10/2008 | Blomme | ................ | B62K 3/04 280/281.1 |
| 2010/0096207 A1* | 4/2010 | Nagao | ................ | B62K 25/24 180/223 |
| 2011/0248469 A1* | 10/2011 | Chubbuck | .............. | B62K 21/02 280/276 |
| 2012/0248717 A1* | 10/2012 | Tsujii | ................ | B62K 5/01 280/5.509 |
| 2013/0161925 A1* | 6/2013 | Lavabre | ................ | B62K 25/24 280/279 |
| 2013/0249187 A1* | 9/2013 | Chubbuck | .............. | B62K 21/20 280/276 |
| 2015/0274250 A1* | 10/2015 | Kuwabara | .............. | B62K 25/24 280/276 |

FOREIGN PATENT DOCUMENTS

| | | |
|---|---|---|
| TW | 383409 | 7/2010 |
| TW | M383409 | 7/2010 |
| TW | I400172 | 7/2013 |
| TW | I400172 | 7/2013 |

OTHER PUBLICATIONS

Taiwan Office Action, 5 pages.
International Search Report, dated Oct. 4, 2016 (Oct. 4, 2016), 2 pages.
Written Opinion, 4 pages.
European Search Report dated Sep. 6, 2018, 7 pages.

* cited by examiner

FRONT FORK FOR SADDLED VEHICLE

TECHNICAL FIELD

The present invention relates to a front fork for a saddled vehicle.

BACKGROUND ART

Conventionally, as a front fork that supports a front wheel, there has been known a structure that is tapered to a lower part in side view (refer to Patent Literature 1, for example).

The front fork is arm-shaped, so that the structure is simpler as compared with, for example, a telescopic type front fork, and reduction in weight is enabled.

CITATION LIST

Patent Literature

Patent Literature 1: Japanese Patent Laid-Open No. 2011-121435

SUMMARY OF INVENTION

Technical Problem

In the case of using an arm-shaped front fork, it is desired to reduce an unsprung weight by further reducing the weight of the front fork in order to enhance followability of the front wheel to roughness, but when lightening is performed to reduce the weight, for example, appearance may be impaired. Further, the arm-shaped front fork tends to have high rigidity, so that consideration to set appropriate rigidity is necessary.

Therefore, an object of the present invention is to provide a front fork in which an unsprung weight of an arm-shaped front fork is reduced, rigidity is optimized, and further, appearance can be enhanced.

Solution to Problem

All of the contents of Japanese Patent Application No. 2015-188547 filed on Sep. 25, 2015 are incorporated in the specification.

In order to solve the above described problem, the present invention is a front fork for a saddled vehicle including a handle steering shaft (61) that is operated by a handle (21), a main frame (62) that rotatably supports the handle steering shaft (61), a front wheel steering shaft (12a) that is disposed in front of the handle steering shaft (61) and steers a front wheel (13), a fork support portion (68) that rotatably supports the front wheel steering shaft (12a), link members (66, 67) that swingably connect the respective main frame (62) and fork support portion (68), and a shock absorber (69) that is laid on the respective main frame (62) and link members (66, 67), including the front wheel steering shaft (12a) at an upper portion while pivotally supporting the front wheel (13) at a lower end portion, wherein the front fork (12) comprises a pair of left and right arm portions (12c), and a bridge portion (12d) integrally connecting the left and right arm portions (12c), and lightening holes (12h, 12j, 12p) are provided in the arm portion (12c), the lightening holes (12h, 12j, 12p) are covered with a cover member (141) that is provided to be exposed to an outer side surface of the arm portion (12c), from outside.

According to the configuration, the lightening holes are covered with the cover member from the outer side, so that the front fork can be made light by formation of the lightening holes while appearance is enhanced.

Accordingly, the unsprung weight can be made light. Further, by formation of the lightening holes to the arm portion, rigidity of the arm portion can be set to be optimal.

In the above described configuration, the cover member (141) may be provided in a recessed portion (12f) formed in the outer side surface of the arm portion (12c).

Further, in the above described configuration, the cover member is a reflector (141) that reflects light from a vehicle side part, the reflector (141) has a shape along an external shape of the arm portion (12c), at least a part of the reflector (141) may overlap a brake disk (64a) attached to the front wheel (13) and overlaps a wheel (13b) included in the front wheel (13) in side view.

Further, in the above described configuration, the front fork (12) integrally includes a caliper support portion (12q) that supports a brake caliper (64b) that sandwiches the brake disk (64a) to brake, the lightening holes may be a first lightening hole (12h) provided in an upper portion of the recessed portion (12f), and a second lightening hole (12j) that is provided in the recessed portion (12f) and is provided at a substantially same height as an upper end of the caliper support portion (12q).

Further, in the above described configuration, at an edge of the first lightening hole (12h), a reflector support portion (12k) that supports the reflector (141) is provided, a third lightening hole (12p) that is the lightening hole is provided in an inner side surface of the arm portion (12c), a rubber member (146) is fitted in the third lightening hole (12p), and the first lightening hole (12h) and the reflector support portion (12k) may overlap the third lightening hole (12p) in side view.

Further, in the above described configuration, the third lightening hole (12p) may have an opening area formed to be larger than the first lightening hole (12h).

Further, in the above described configuration, the second lightening hole (12j), a reflector positioning hole (12m) formed in a bottom surface of the recessed portion (12f) to position the reflector (141), and a reflector attaching hole (12s) formed to attach the reflector (141) to the reflector support portion (12k) may be disposed in a straight line in side view.

Further, in the above described configuration, the third lightening hole (12p) may be formed into an elliptical shape in which a long axis (140) is provided to be along a longitudinal direction of the arm portion (12c).

Advantageous Effects of Invention

The front fork of the present invention includes the pair of left and right arm portions, and the bridge portion integrally connecting the left and right arm portions, and the lightening holes are provided in the arm portion, the lightening holes are covered with the cover member that is provided to be exposed to the outer side surface of the arm portion, from the outer side, so that the front fork can be made light by formation of the lightening holes while appearance is enhanced by covering the lightening holes with the cover member from the outer side. Accordingly, the unsprung weight can be reduced. Further, by formation of the lightening holes to the arm portion, the rigidity of the arm portion can be set to be optimal.

Further, the cover member is provided in the recessed portion formed in the outer side surface of the arm portion, so that the protruded amount of the cover member protruding from the outer side surface of the front fork can be restrained, and air resistance can be decreased.

Further, the cover member is the reflector that reflects light from the vehicle side part, the reflector has the shape along the external shape of the arm portion, at least a part of the reflector overlaps the brake disk attached to the front wheel and overlaps the wheel included in the front wheel in side view, so that the reflector can be formed to be large to be along the external shape of the arm portion, and visibility of the reflector can be enhanced.

Further, the front fork integrally includes the caliper support portion that supports the brake caliper that sandwiches the brake disk to brake, the lightening holes are the first lightening hole provided in the upper portion of the recessed portion, and the second lightening hole that is provided in the recessed portion and is provided at the substantially same height as the upper end of the caliper support portion, so that by providing a plurality of lightening holes, the front fork can be made lighter, and the unsprung weight can be reduced more. Further, the second lightening hole is provided in the vicinity of the caliper support portion, so that rigidity balance of the front fork can be set to be appropriate.

Further, at the edge of the first lightening hole, the reflector support portion that supports the reflector is provided, the third lightening hole that is the lightening hole is provided in the inner side surface of the arm portion, the rubber member is fitted in the third lightening hole, and the first lightening hole and the reflector support portion may overlap the third lightening hole in side view, so that by providing the third lightening hole, the front fork can be made much lighter and the unsprung weight can be reduced more. Further, the attaching and detaching work at the time of attaching or detaching the reflector with respect to the reflector support portion can be performed through the third lightening hole. Further, the reflector support portion can be protected from the inside in the vehicle width direction by the rubber member.

Further, the third lightening hole has the opening area formed to be larger than the first lightening hole, so that the attaching and detaching work of the reflector with respect to the reflector support portion can be performed easily, and workability can be enhanced.

Further, the second lightening hole, the reflector positioning hole formed in the bottom surface of the recessed portion to position the reflector, and the reflector attaching hole formed to attach the reflector to the reflector support portion are disposed in the straight line in side view, so that processing of the second lightening hole, the reflector positioning hole 12*m* and the reflector attaching hole 12*s* can be easily performed by a processing machine.

Further, since the third lightening hole is formed into the elliptical shape in which the long axis is provided to be along the longitudinal direction of the arm portion, a hand and a tool can be easily inserted into the third lightening hole, and attaching and detaching work of the reflector can be easily performed, so that workability can be enhanced.

DESCRIPTION OF EMBODIMENTS

Hereunder, an embodiment of the present invention will be described with reference to the drawings. In the explanation, statements of directions such as a front, a rear, a left, and a right, and an up and a down are the same as directions to a vehicle body unless specially described otherwise. Reference sign FR illustrated in the respective drawings denotes a vehicle body front side, reference sign UP denotes a vehicle body upper side, and reference sign LH denotes a vehicle body left side.

First Embodiment

Figure 1:
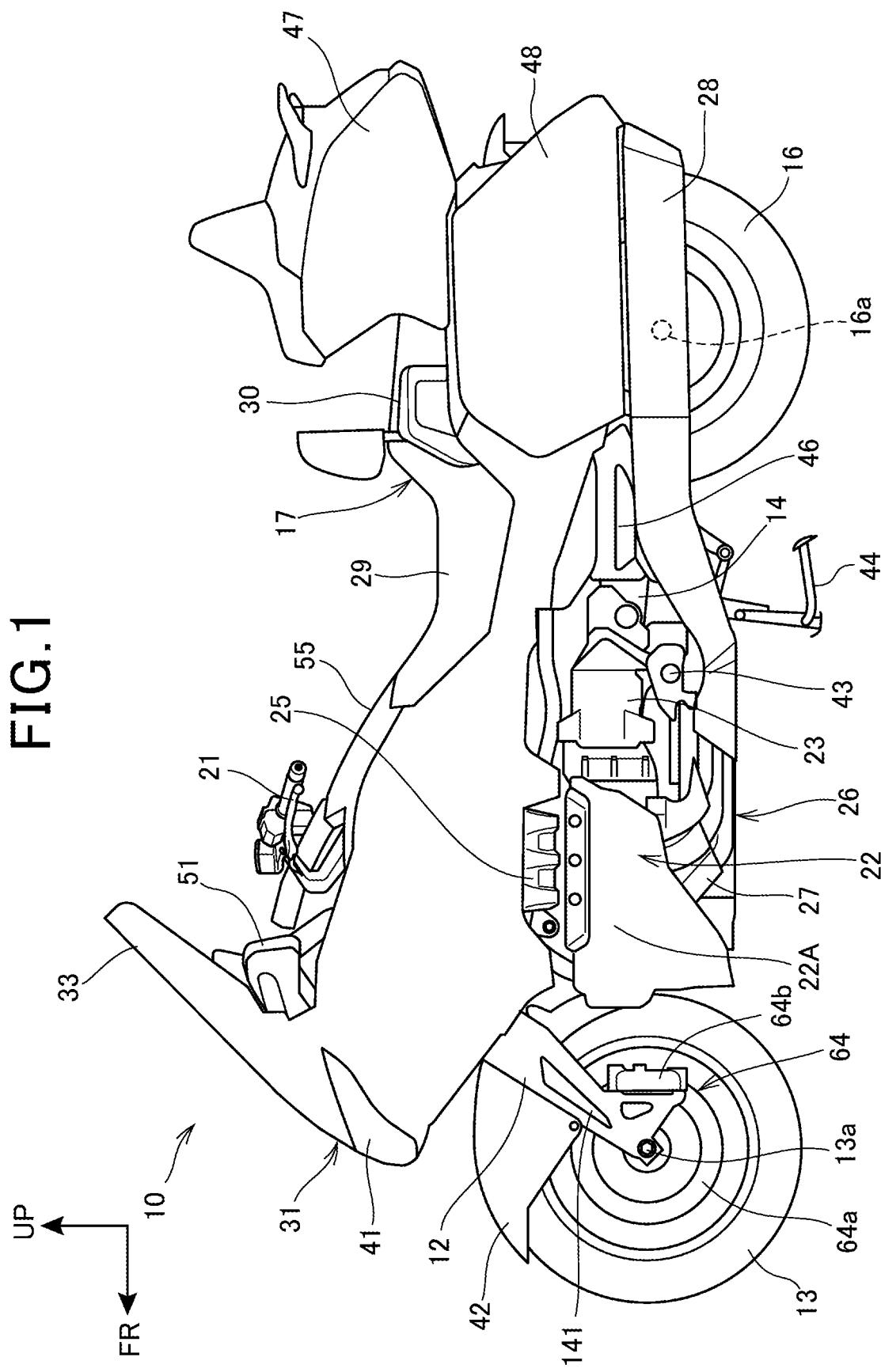
FIG. 1 is a left side view of a motorcycle including a front fork according to the present invention (a first embodiment).

FIG. 1 is a left side view (a first embodiment) of a motorcycle 10 including a front fork according to the present invention.

The motorcycle 10 is a saddled vehicle including a front wheel 13 that is supported at a front portion of a vehicle body frame 11 (refer to FIG. 3) via a front swing arm 12, a rear wheel 16 that is supported at a lower portion of the vehicle body frame 11 via a rear swing arm 14, and a seat 17 provided on a vehicle body upper portion.

The front swing arm 12 is steered with a handle 21 provided on the vehicle body upper portion.

An engine 22 supported at the vehicle body frame 11 is disposed behind the front wheel 13, and a transmission 23 is integrally provided at a rear portion of the engine 22.

The front wheel 13 is supported at a lower end portion of the front swing arm 12 via an axle 13*a*, and the rear wheel 16 is supported at a rear end portion of the rear swing arm 14 via an axle 16*a*.

The engine 22 is of a horizontal opposed type, and cylinder portions 22A are respectively protruded to a left and right sides from a crankcase (not illustrated) provided in a central portion in a vehicle width direction. An intake device 25 is connected to an upper portion of the cylinder portion 22A, and an exhaust device 26 is connected to a lower portion of the cylinder portion 22A.

The exhaust device 26 is configured by a plurality of exhaust pipes 27 extending downward and rearward from the cylinder portion 22A, and a muffler 28 connected to rear end portions of these exhaust pipes 27.

In the transmission 23, an output shaft (not illustrated) is provided at a rear portion thereof, a driveshaft (not illustrated) extends from the output shaft to the rear wheel 16, and power is transmitted from the transmission 23 to the rear wheel 16 via the driveshaft.

A driver seat 29 and a passenger seat 30 that configure the seat 17 are disposed at an obliquely lower side behind the handle 21. A front part and both side parts of the motorcycle 10 are covered with a vehicle body cover 31.

Reference sign 41 in the drawing denotes a headlight, 42 denotes a front fender of the first embodiment which covers the front wheel 13 from above, 43 denotes a driver step, 44 denotes a main stand, 46 denotes a passenger step, 47 denotes a trunk box, and 48 denotes a saddle bag.

Figure 2:
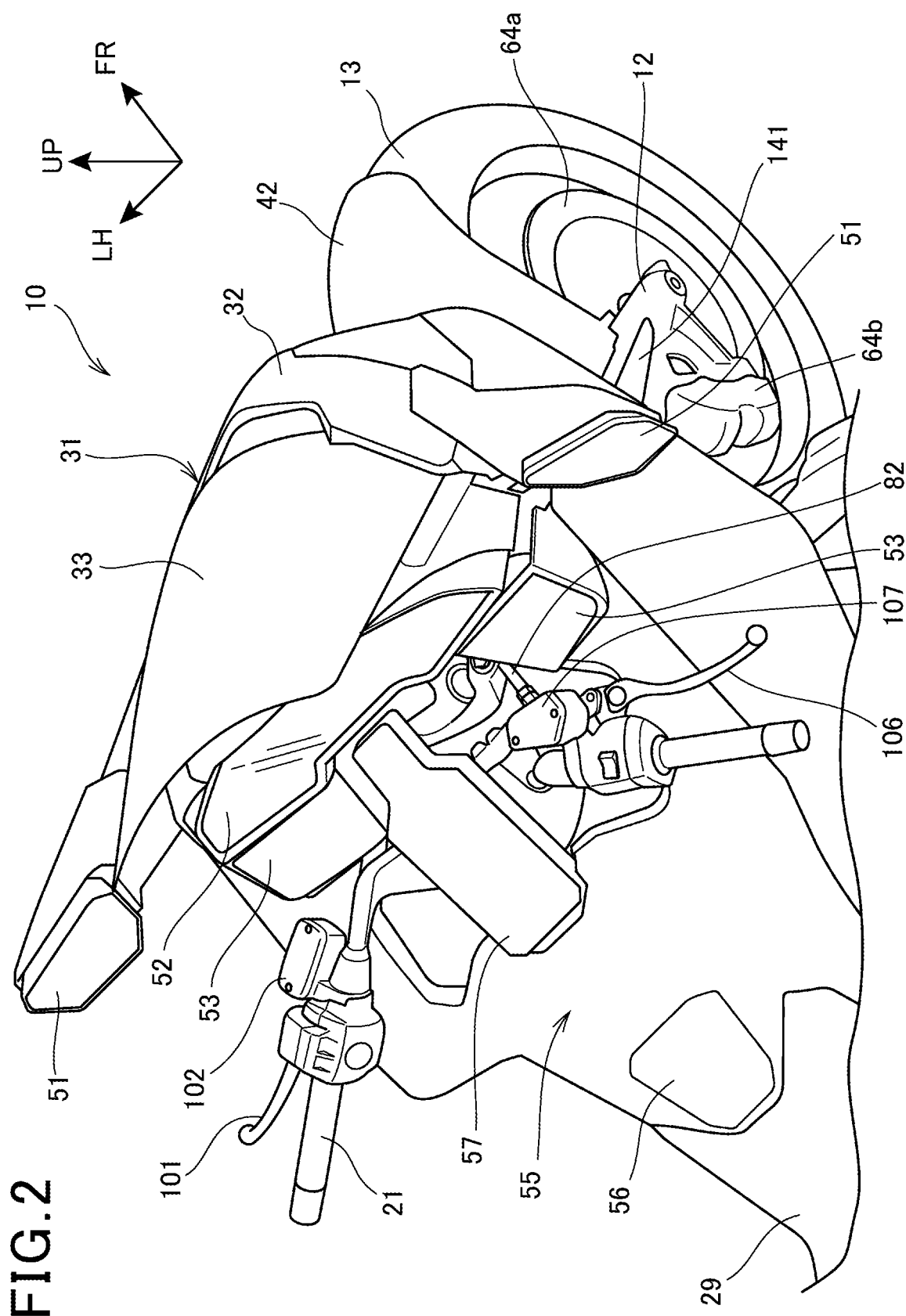
FIG. 2 is a perspective view of a vehicle body front part of the motorcycle as seen obliquely from above.

FIG. 2 is a perspective view of a vehicle body front part of the motorcycle 10 as seen obliquely from above.

In the vehicle body front part of the motorcycle 10, a front cover 32 configuring the vehicle body cover 31, a window screen 33 provided at an upper portion of the front cover 32, and rearview mirrors 51 and 51 provided at both side portions of the front cover 32 are disposed.

A meter panel 52, and a pair of left and right speakers 53 and 53 are disposed at a rear side of the window screen 33. Further, the handle 21 is disposed behind the window screen 33.

The handle 21 is connected to a handle steering shaft (not illustrated) supported at the vehicle body frame 11. The handle steering shaft is connected to a front wheel steering shaft (not illustrated) that is a rotating shaft of the front swing arm 12, so that the handle steering shaft rotates with the rotational operation of the handle 21 and the front wheel steering shaft rotates, whereby the front wheel 13 is steered.

The tank cover 55 that covers the fuel tank (not illustrated) is provided under the handle 21. The tank cover 55 is provided with a fuel lid 56 that covers an upper part of a fuel inlet port of the fuel tank openably and closably, and an operation panel 57 for performing setting or the like of information displayed on the meter panel 52.

Figure 3:
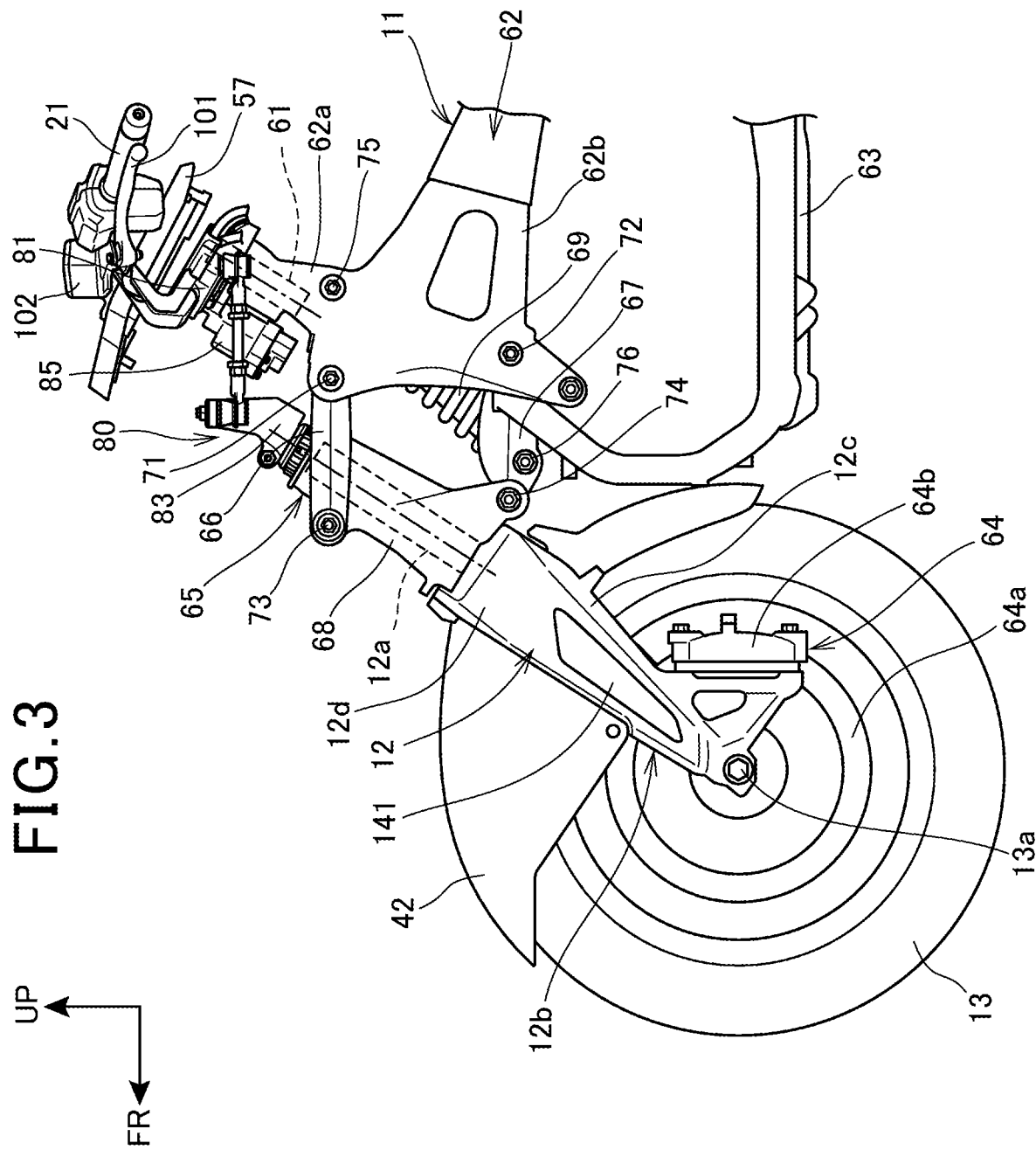
FIG. 3 is a left side view illustrating the vehicle body front part of the motorcycle.

FIG. 3 is a left side view illustrating the vehicle body front part of the motorcycle 10, and illustrates a part of the vehicle body frame 11 and a front suspension mechanism 65 with the vehicle body cover, the engine and the like removed.

The vehicle body frame 11 includes a main frame 62 that rotatably supports the handle steering shaft 61 that is rotated by the handle 21, and a lower frame 63 that is attached to a front lower portion of the main frame 62.

The front wheel 13 is braked by a front wheel disk brake device 64. The front wheel disk brake device 64 is configured by a brake disk 64a provided integrally with the front wheel 13, and a brake caliper 64b attached to a rear portion of a lower end portion of the front swing arm 12 to brake the brake disk 64a.

The main frame 62 supports the front suspension mechanism 65 at a front portion.

The front suspension mechanism 65 is configured by an upper link 66, a lower link 67, a fork support portion 68, the front swing arm 12 and a front cushion unit 69.

The upper link 66 and the lower link 67 are respectively disposed at a front portion of the main frame 62 to be spaced vertically, and are respectively supported at the main frame 62 via support shafts 71 and 72 to be swingable up and down. Further, the upper link 66 and the lower link 67 are respectively disposed to extend in a front-rear direction and to be parallel with each other.

In the fork support portion 68 that is cylindrical and inclines rearward, a front end portion of the upper link 66 is rotatably connected to an upper front portion thereof via a support shaft 73, and a front end portion of the lower link 67 is rotatably supported at a lower rear portion via a support shaft 74.

In the fork support portion 68, the support shaft 73 is provided at the upper front portion, and the support shaft 74 is provided at the lower rear portion in this way, whereby the support shafts 73 and 74 can be disposed by being aligned vertically, in more detail, the support shaft 74 can be disposed rearward of the support shaft 73. As a result, when a distance between support points of the upper link 66 and the lower link 67 is set as the same, the lower portion of the front portion of the main frame 62 does not have to be protruded forward significantly, and the main frame 62 can be made compact.

The front swing arm 12 is disposed to incline rearward, and is configured by a front wheel steering shaft 12a rotatably supported at the fork support portion 68, and a fork portion 12b connected integrally at a lower end portion of the front wheel steering shaft 12a.

The front wheel steering shaft 12a is inserted through a fork shaft insertion hole (not illustrated) formed in the fork support portion 68, and is rotatably supported by the fork support portion 68.

The fork portion 12b is integrally configured by a pair of left and right arm portions 12c with the axle 13a attached to lower end portions, and a bridge portion 12d that connects upper end portions of the left and right arm portions 12c.

The front wheel steering shaft 12a is attached to the bridge portion 12d. The axle 13a rotatably supports the front wheel 13.

The front cushion unit 69 is a shock absorber in which an upper end portion is swingably supported at the main frame 62 via a support shaft 75, and a lower end portion is swingably supported at the lower link 67 via a support shaft 76.

The front wheel 13 is steered with a steering mechanism 80 including the handle 21.

Figure 4:
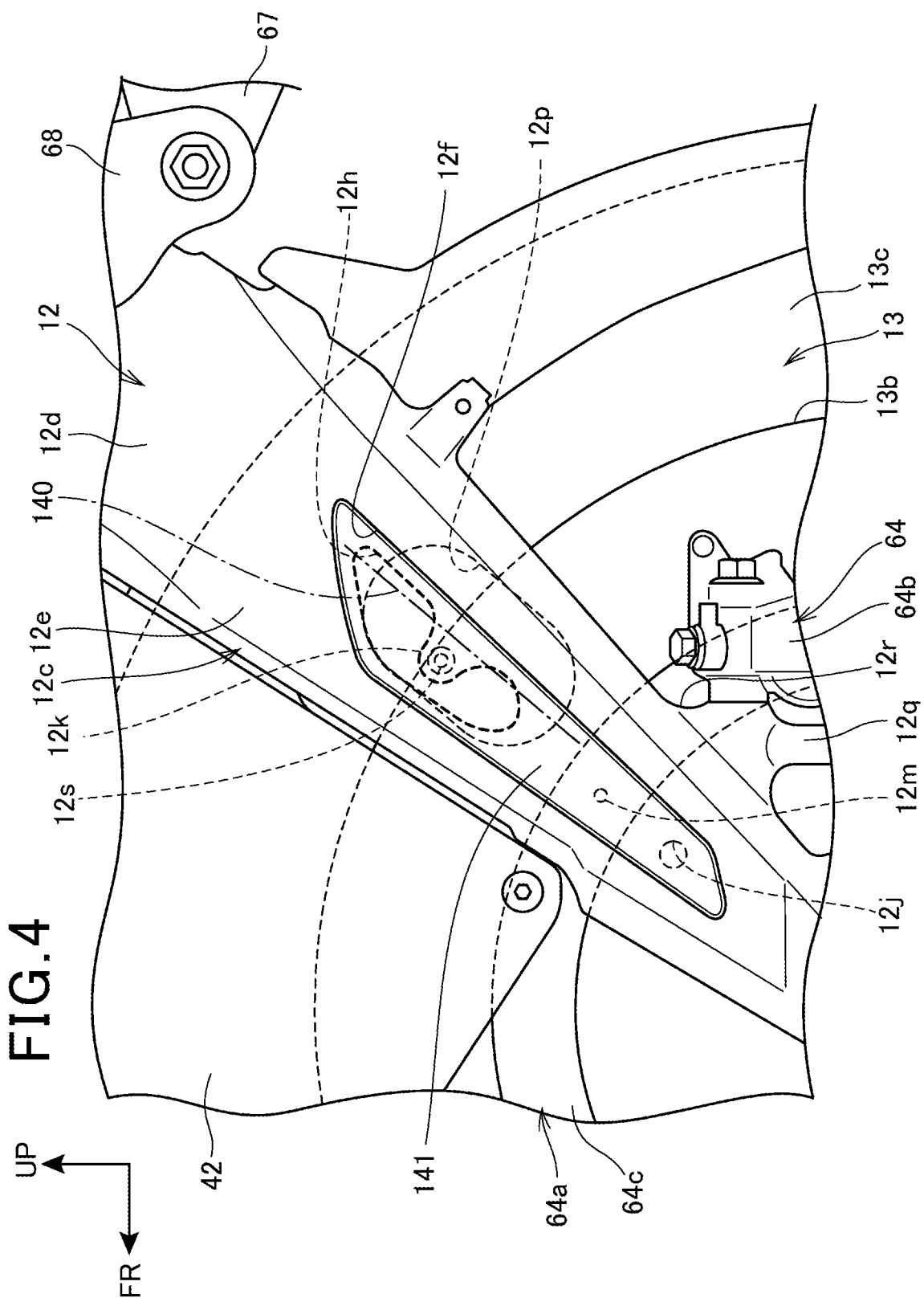
FIG. 4 is a left side view illustrating the front fork and a periphery thereof.

FIG. 4 is a left side view illustrating the front swing arm 12 and a periphery thereof.

In the front swing arm 12, a recessed portion 12f substantially in a parallelogram is formed in an outer side surface 12e of the arm portion 12c to extend along a longitudinal direction of the arm portion 12c, and a first lightening hole 12h is formed in a bottom surface 12g (refer to FIG. 5B) of the recessed portion 12f. Further, in the recessed portion 12f, a reflector 141 as a reflection plate that reflects light from a vehicle side part is disposed to be fitted in the entire recessed portion 12f, and the first lightening hole 12h is covered with the reflector 141 from a vehicle body side part. The reflector 141 is formed to have an external shape substantially similar to an outline of the recessed portion 12f.

Further, in the bottom surface 12g of the recessed portion 12f, a second lightening hole 12j circular in side view is formed obliquely forward below the first lightening hole 12h. The second lightening hole 12j is also covered with the reflector 141 from the vehicle body side part.

Further, in the bottom surface 12g, a reflector support portion 12k which is formed at an edge of the first lightening hole 12h to support the reflector 141, and a reflector positioning hole 12m that positions the reflector 141 are provided.

The reflector support portion 12k is formed to protrude into the first lightening hole 12h, and a reflector attaching hole 12s for attaching the reflector 141 is formed.

In the arm portion 12c, an elliptical third lightening hole 12p having a larger opening area than the first lightening hole 12h is formed in an inner side surface 12n (refer to FIG. 5A) to overlay the first lightening hole 12h and the reflector support portion 12k in side view. The third lightening hole 12p is formed so that an elliptical long axis 140 is along a longitudinal direction of the arm portion 12c. Further, in the third lightening hole 12p, a width in a direction orthogonal to the long axis 140 (a direction in which a short axis of the ellipse extends) is larger than the first lightening hole 12h, the recessed portion 12f and the reflector 141.

The arm portion 12c is formed into a hollow structure, includes an outer wall outside in a vehicle width direction of a hollow portion, and an inner wall inside in the vehicle width direction of the hollow portion, the first lightening hole 12h and the second lightening hole 12j are formed in the outer wall, and the third lightening hole 12p is formed in the inner wall. A detailed structure of the fork portion 12b will be described with FIGS. 5A, 5B, 6A and 6B.

The recessed portion 12f overlaps the front wheel 13 in side view, in detail, a wheel 13b configuring the front wheel 13 and a tire 13c fitted to the wheel 13b, and the brake disk 64a. Further, the first lightening hole 12h, the reflector support portion 12k and the third lightening hole 12p overlap the wheel 13b and the tire 13c in side view. The second lightening hole 12j is provided at a substantially same height as an upper end 12r of a caliper support portion 12q formed at a lower end portion of the arm portion 12c to support the brake caliper 64b, and is disposed inside in a radial direction from a donut-shaped sandwiched portion 64c sandwiched by the brake caliper 64b, in the brake disk 64a.

The reflector positioning hole 12m overlaps the sandwiched portion 64c of the brake disk 64a in side view.

As described above, the reflector 141 is so large that the lower end portion is disposed in the vicinity of the caliper support portion 12q, and the upper end portion is disposed in the vicinity of an outer circumferential surface of the front wheel 13, so that the recessed portion 12f is also large. Accordingly, when a bottom wall 12x (refer to FIG. 9) of the recessed portion 12f is made thinner than the other portions than the recessed portion 12f in the outer wall 12t (refer to FIG. 7), the front swing arm 12 can be made light, so that the unsprung weight can be reduced.

FIG. 5 is a first explanatory view explaining the fork portion 12b.

Figure 5B:
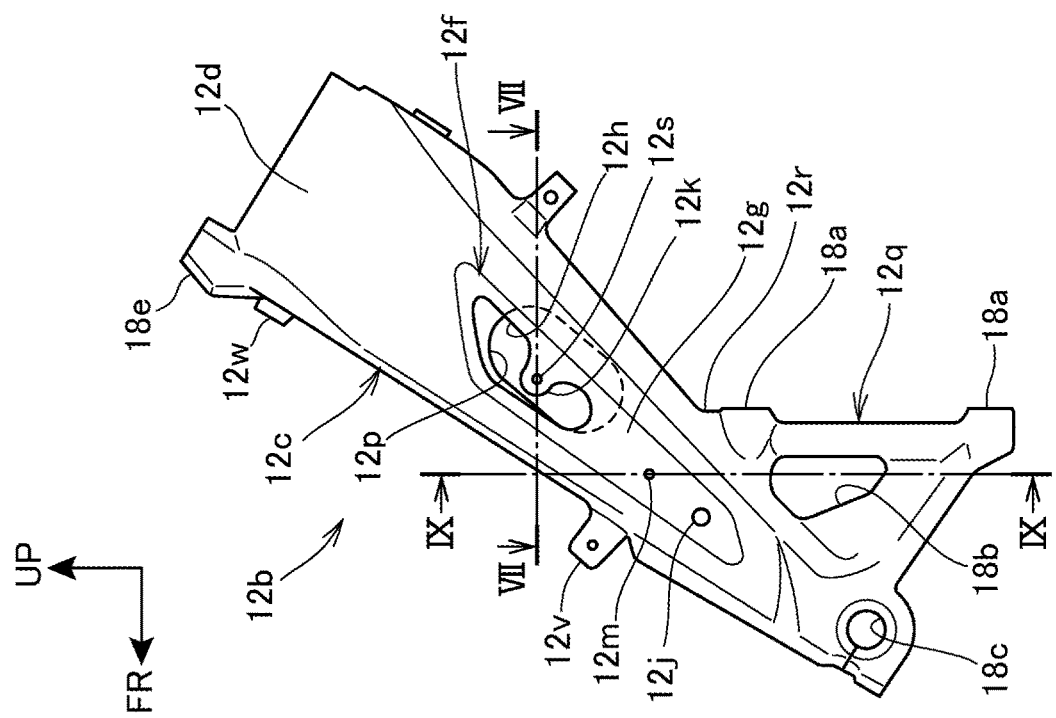
FIGS. 5A and 5B are first explanatory views explaining a fork portion.
Figure 5A:
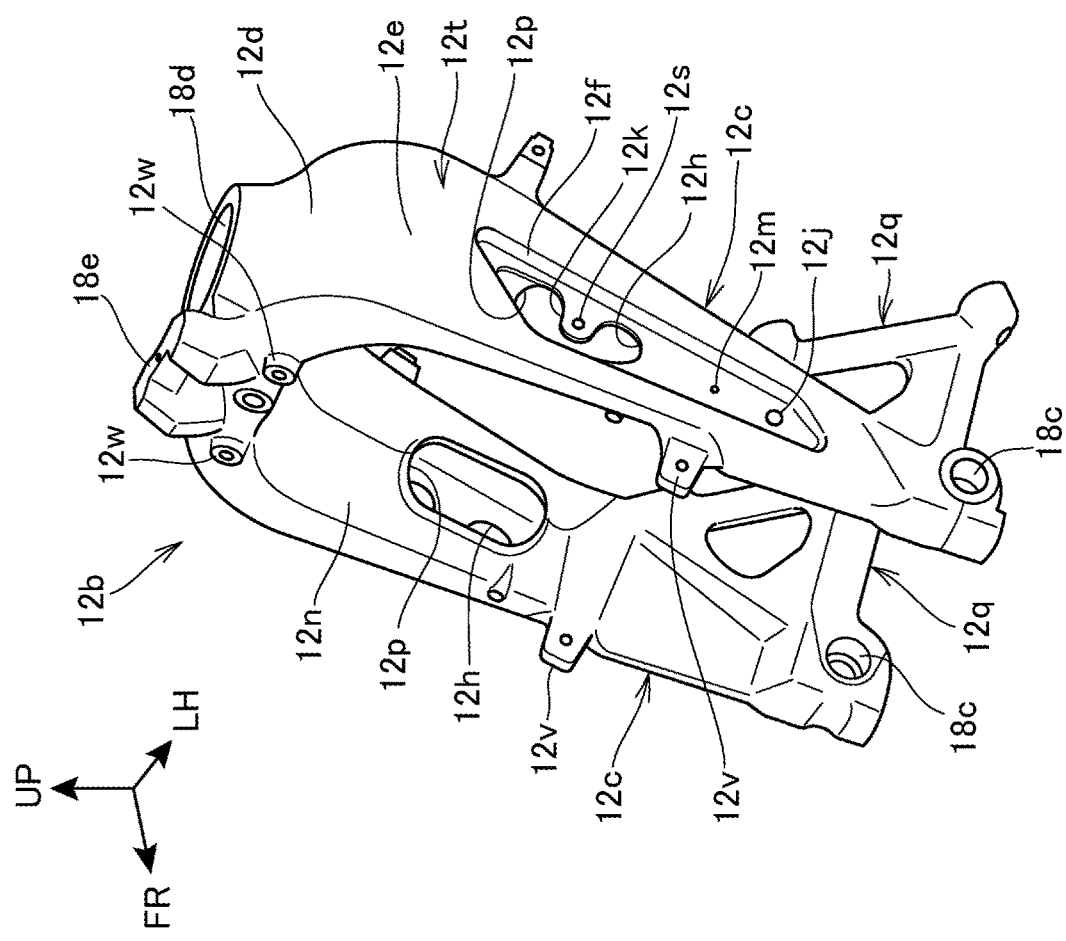

FIG. 5A is a perspective view of the fork portion 12b, and FIG. 5B is a left side view of the fork portion 12b.

As illustrated in FIG. 5A, the fork portion 12b is integrally configured by the pair of left and right arm portions 12c and 12c which are formed to be straight, the bridge portion 12d which connects the upper end portions of the left and right arm portions 12c and 12c, and the caliper support portion 12q formed at rear portions of lower end portions of the left and right arm portions 12c and 12c. As for a material of the fork portion 12b, the fork portion 12b is formed from an aluminum alloy by die casting, for example.

Of the arm portion 12c and the bridge portion 12d, at least the arm portion 12c is formed to be of a hollow structure, and the arm portion 12c includes the outer wall 12t forming an outer side in the vehicle width direction and an inner wall 12u forming an inner side in the vehicle width direction.

In the outer wall 12t, the recessed portion 12f on an outer side surface 12e, the first lightening hole 12h, the second lightening hole 12j, the reflector support portion 12k and the reflector positioning hole 12m are formed.

In the inner wall 12u, the third lightening hole 12p is formed.

In order to attach the front fender 42 (refer to FIG. 3), fender lower portion attaching portions 12v and 12v that protrude to a front side are formed at front edges of the left and right arm portions 12c and 12c, and a pair of left and right fender upper portion attaching portions 12w and 12w are respectively formed at a front edge of the bridge portion 12d.

As illustrated in FIG. 5B, the arm portion 12c is formed into a taper shape so as to taper at a lower end portion side, and the caliper support portion 12q which is in a substantially triangular shape in side view is provided at a rear portion of a lower end portion of the arm portion 12c.

The recessed portion 12f of the arm portion 12c has an outline thereof formed into a substantially parallelogram in side view, and the first lightening hole 12h and the reflector support portion 12k are formed in an upper portion of the recessed portion 12f. The second lightening hole 12j is formed in a lower portion of the recessed portion 12f. The reflector positioning hole 12m is provided at a position near to the second lightening hole 12j between the first lightening hole 12h and the second lightening hole 12j, in the recessed portion 12f.

In the caliper support portion 12q, caliper fastening portions 18a and 18a that fasten the brake caliper 64b (refer to FIG. 3) are formed in an upper end portion and a lower end portion in a side at a rear side of the triangular shape. Screw holes (not illustrated) are respectively formed in the caliper fastening portions 18a and 18a, and bolts that fasten the brake caliper 64b are screwed into screw holes. Reference sign 18b is an opening portion formed in the caliper support portion 12q for the purpose of weight reduction.

Axle insertion holes 18c in which the axle 13a (refer to FIG. 3) is inserted and fixed is formed in the lower end portion of the arm portion 12c.

Figure 6A:
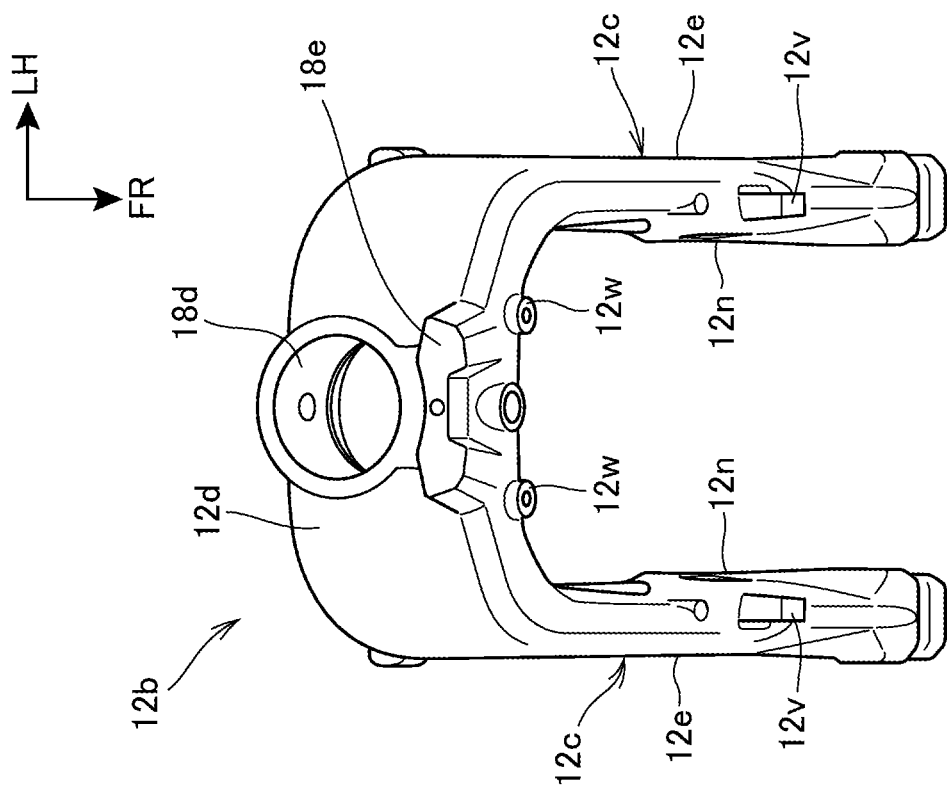
FIGS. 6A and 6B are second explanatory views explaining the fork portion.
Figure 6B:
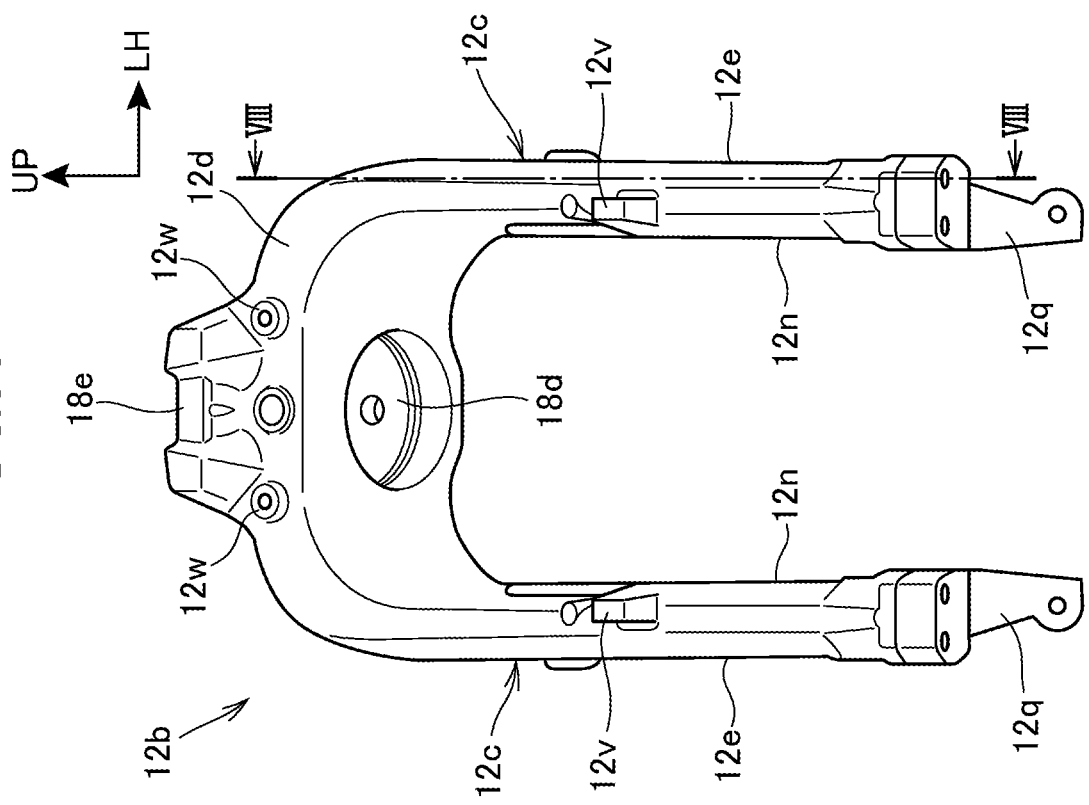

FIGS. 6A and 6B are second explanatory views explaining the fork portion 12b.

FIG. 6A is a front view of the fork portion 12b, and FIG. 6B is a plan view of the fork portion 12b.

As illustrated in FIG. 6A, the left and right arm portions 12c and 12c are disposed substantially parallel with each other, and the bridge portion 12d extends inward in the vehicle width direction while curving from the upper ends of the left and right arm portions 12c and 12c.

As illustrated in FIG. 6B, a steering shaft insertion hole 18d in which the front wheel steering shaft 12a (refer to FIG. 3) is inserted and fixed is formed in a center in the vehicle width direction of the bridge portion 12d. Further, an upward protruded wall 18e that protrudes upward is integrally formed at a front edge of the bridge portion 12d in front of the steering shaft insertion hole 18d. The upward protruded wall 18e is a portion that covers a gap formed between the fork support portion 68 (refer to FIG. 3) by which the front wheel steering shaft 12a is supported and the bridge portion 12d.

By providing the upward protruded wall 18e in this way, entry of rainwater, dust and the like into the fork support portion 68 from the above described gap is restrained.

Figure 7:
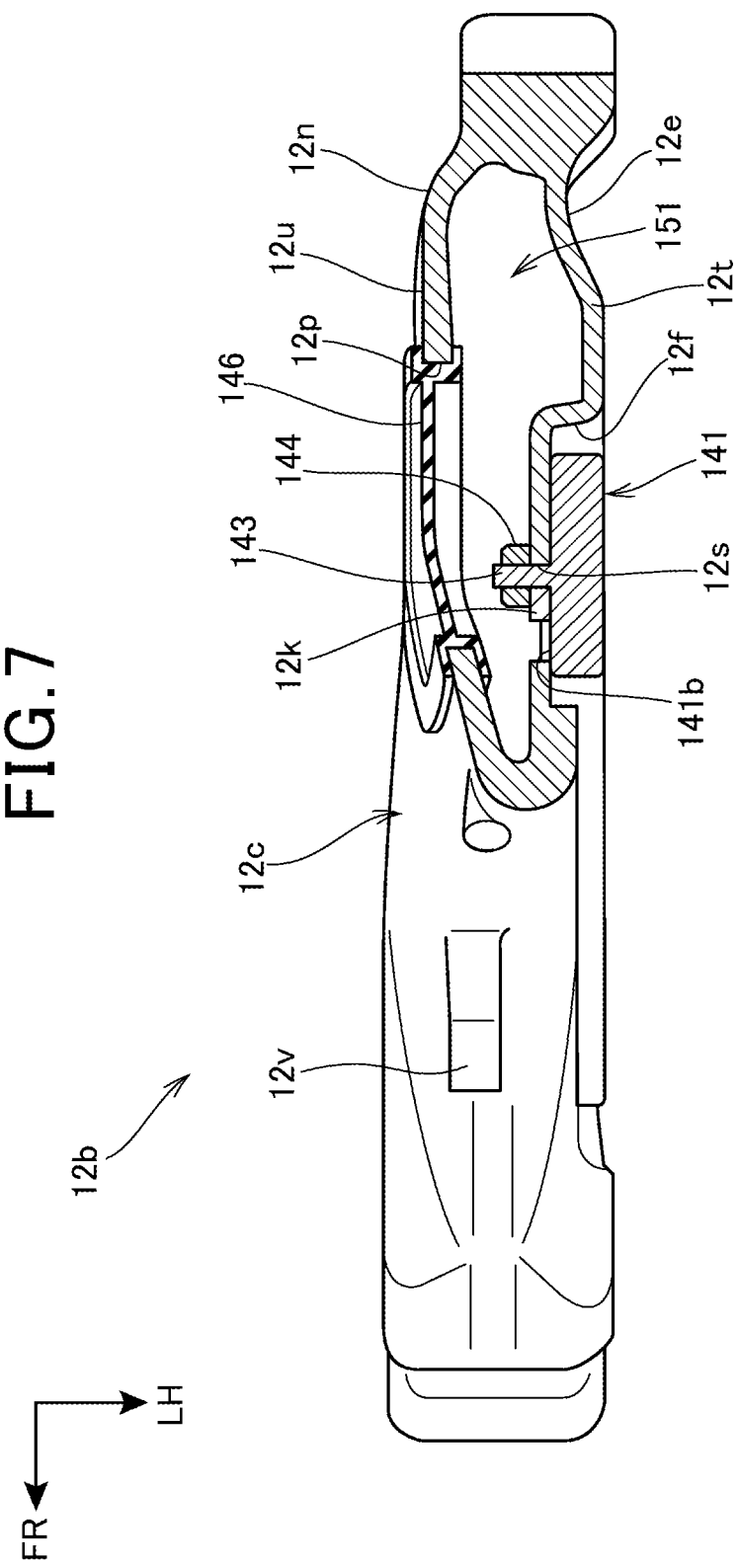
FIG. 7 is a sectional view taken along line VII-VII in FIG. 5B.

FIG. 7 is a sectional view taken along line VII-VII in FIG. 5B.

In FIG. 7, sections of the reflector 141, a nut 144 and a rubber plug 146 are also illustrated with the arm portion 12c.

The reflector 141 is provided with a screw portion 143 with a male screw formed, on a back surface 141b thereof. The screw portion 143 is inserted into the reflector attaching hole 12s of the reflector support portion 12k, and the nut 144 is screwed into a tip end portion of the screw portion 143, whereby the reflector 141 is fixed to the recessed portion 12f. The nut 144 is inserted into the arm portion 12c from the third lightening hole 12p in the inner wall 12u, and is screwed into the screw portion 143.

The rubber plug 146 is fitted in the third lightening hole 12p, and entry of rainwater, dust and the like into the arm portion 12c from the third lightening hole 12p is prevented. Further, the rubber plug 146 prevents flying pebbles or the like from hitting the reflector support portion 12k, the screw portion 143 and the nut 144 through the third lightening hole 12p.

The arm portion 12c is formed into a shape in which the width in section in the vehicle width direction gradually becomes smaller toward the front side and the front edge is smooth and sharp. Thereby, air resistance of the arm portion 12c during travel of the vehicle can be decreased.

Figure 8:
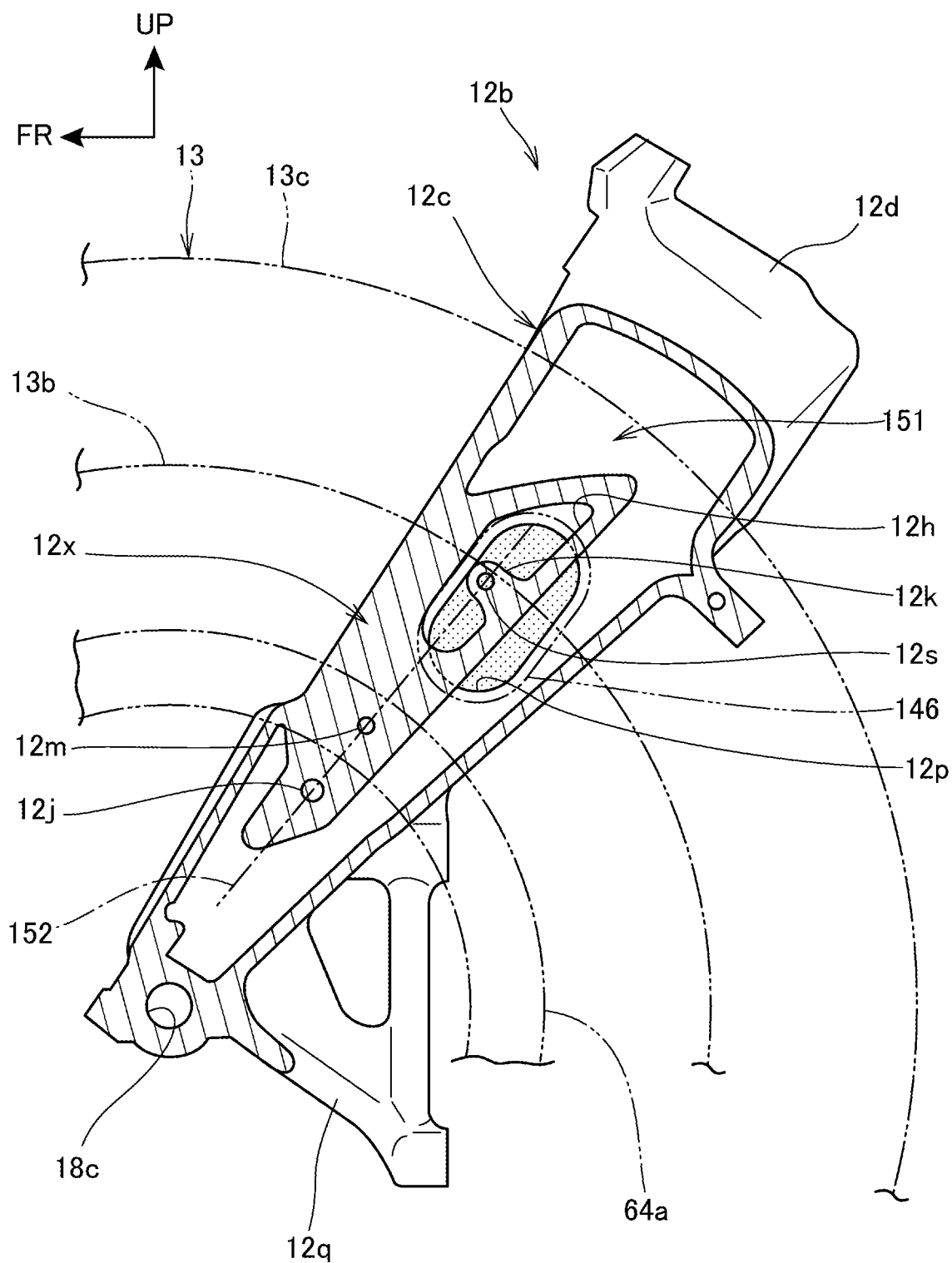
FIG. 8 is a sectional view taken along line VIII-VIII in FIG. 6A.

FIG. 8 is a sectional view taken along line VIII-VIII in FIG. 6A, and is a sectional view cut along the bottom wall 12x forming the bottom surface 12g (refer to FIG. 5B) of the recessed portion 12f (refer to FIG. 5B) of the arm portion 12c.

In the arm portion 12c, a hollow portion 151 is formed around the bottom wall 12x of the arm portion 12c. In the bottom wall 12x, the first lightening hole 12h, the second lightening hole 12j, the reflector support portion 12k and the reflector positioning hole 12m are formed.

The reflector attaching hole 12s of the reflector support portion 12k, the reflector positioning hole 12m and the second lightening hole 12j are disposed in a straight line 152. The reflector attaching hole 12s, the reflector positioning hole 12m and the second lightening hole 12j are disposed in this way, whereby boring work for them can be easily performed by moving a work piece (a material before forming the fork portion 12b) or a tool attached to a processing machine rectilinearly, and productivity can be enhanced.

The reflector attaching hole 12s of the reflector support portion 12k is provided at a position near to a front on the short axis of the ellipse from the center of the elliptical third lightening hole 12p. Consequently, when the reflector 141 (refer to FIG. 4) is attached to the reflector support portion 12k, or the reflector 141 is detached from the reflector support portion 12k, a hand or a tool is inserted into the third lightening hole 12p from a rear side of the arm portion 12c, and the nut 144 can be easily fastened or loosened.

Figure 9:
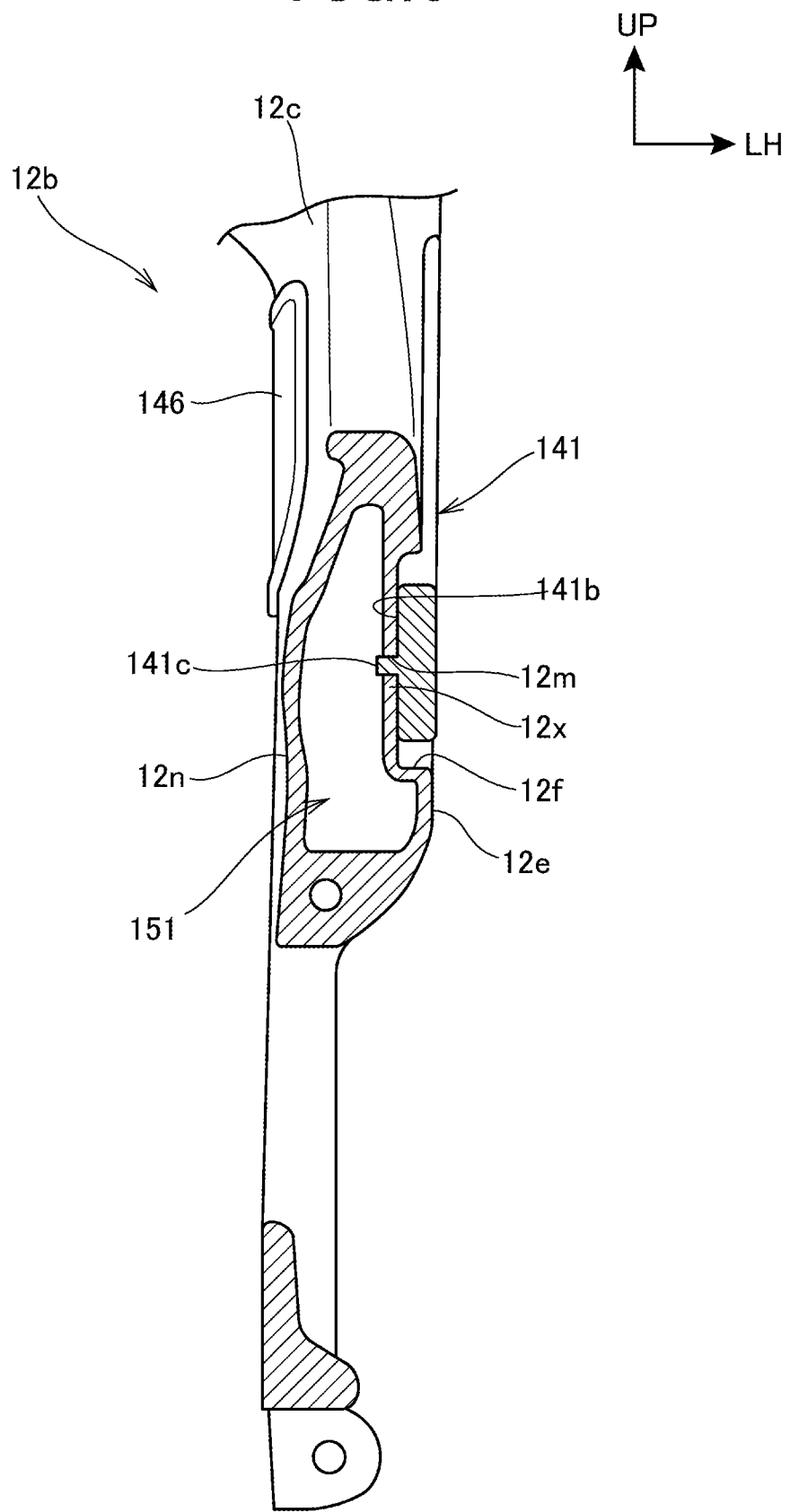
FIG. 9 is a sectional view taken along line IX-IX in FIG. 5B.

FIG. 9 is a sectional view taken along line IX-IX in FIG. 5B.

In the reflector 141, a positioning protruded portion 141c is protrusively formed integrally on the back surface 141b, and the positioning protruded portion 141c is inserted in the reflector positioning hole 12m which is formed in the bottom wall 12x of the arm portion 12c. The reflector positioning hole 12m penetrates through the bottom wall 12x.

By providing the positioning protruded portion 141c at the reflector 141 in this way, the reflector 141 can be prevented from rotating in the recessed portion 12f, and a plurality of fastening portions (the fastening portion by the screw portion 143 and the nut 144 illustrated in FIG. 7) for attaching the reflector 141 to the arm portion 12c do not have to be formed, so that the number of components can be reduced.

Second Embodiment

Figure 10:
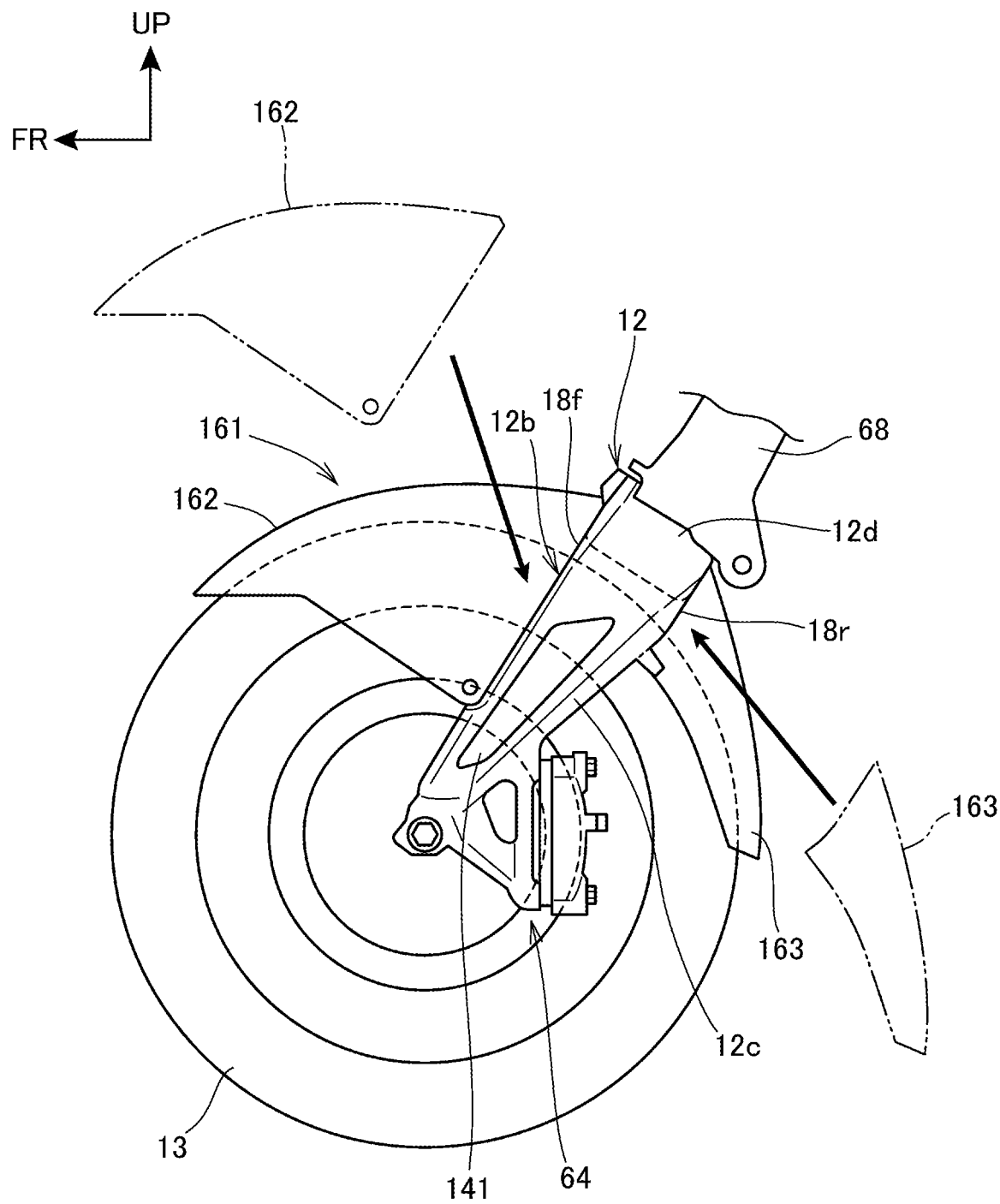
FIG. 10 is a left side view illustrating a front fender of a second embodiment and a periphery thereof.

FIG. 10 is a left side view of a front fender 161 of a second embodiment and surroundings thereof.

In the second embodiment, the same components as in the first embodiment illustrated in FIGS. 1 to 9 are assigned with the same reference signs, and detailed explanation will be omitted.

In the front fender 42 (refer to FIG. 3) of the first embodiment, the rear side fender is inserted to inside of the front swing arm 12 and further extends forward to inside of the front side fender, and the front side fender and the rear side fender are overlaid on each other.

In contrast with this, the front fender 161 of the second embodiment illustrated in FIG. 10 is a component of a two-piece structure formed of a front side fender 162 and a rear side fender 163 that are respectively attached to a front end portion 18f and a rear end portion 18r of the fork portion 12b of the front swing arm 12.

The front side fender 162 is fastened to the left and right arm portions 12c of the fork portion 12b and the front end portion 18f of the bridge portion 12d with a plurality of screws (not illustrated). The rear side fender 163 is fastened to the left and right arm portions 12c of the fork portion 12b and the rear end portion 18r of the bridge portion 12d with a plurality of screws (not illustrated).

An upper part and a rear part of the front wheel 13 and side parts of an upper portion of the front wheel 13 are covered with the front side fender 162, the rear side fender 163 and the fork portion 12b (the left and right arm portions 12c and the bridge portion 12d of the fork portion 12b). That is, the upper portions of the left and right arm portions 12c and the bridge portion 12d function as the front fender.

By causing the fork portion 12b of the front swing arm 12 to function as the front fender in this way, the front side fender 162 and the rear side fender 163 of the front fender 161 can be made compact and light, and cost can be reduced.

In the conventional front fender in which the front and the rear are integrated, a part of the front fender is disposed inside of the front fender, so that the shape of the front fender is restricted. In contrast with this, the front fender 161 of the present embodiment adopts a structure in which the rear end portion of the front side fender 162 is attached to the front end portion 18f of the fork portion 12b, and the front end portion of the rear side fender 163 is attached to the rear end portion 18r of the fork portion 12b, so that not only the shape of the front fender 161, but also the shape of the die for forming the front fender 161 is not restricted, and the degree of freedom of design can be increased.

As illustrated in FIGS. 3 and 4 in the above, in the front swing arm 12 for the motorcycle 10 (refer to FIG. 1) as the saddled vehicle including the handle steering shaft 61 that is operated by the handle 21, the main frame 62 that rotatably supports the handle steering shaft 61, the front wheel steering shaft 12a that is disposed in front of the handle steering shaft 61 and steers the front wheel 13, the fork support portion 68 that rotatably supports the front wheel steering shaft 12a, the upper link 66 and the lower link 67 as the link members that swingably connect the respective main frame 62 and fork support portion 68, and the front cushion unit 69 as the shock absorber that is laid on the respective main frame 62 and link members (the upper link 66 and the lower link 67), and includes the front wheel steering shaft 12a at the upper portion while pivotally supporting the front wheel 13 at the lower end portion, the front swing arm 12 includes the pair of left and right arm portions 12c, and the bridge portion 12d integrally connecting the left and right arm portions 12c, and the first lightening hole 12h, the second lightening hole 12j, and the third lightening hole 12p are provided in the arm portion 12c as the lightening holes, the first lightening hole 12h, the second lightening hole 12j and the third lightening hole 12p are covered with the reflector 141 as the cover member that is provided to be exposed to the outer side surface 12e of the arm portion 12c, from outside.

According to the configuration, the front swing arm 12 can be made light by formation of the first lightening hole 12h, the second lightening hole 12j and the third lightening hole 12p while the appearance is enhanced by covering the first lightening hole 12h, the second lightening hole 12j and the third lightening hole 12p with the reflector 141 from the outer side. Accordingly, the unsprung weight can be made light. Further, the rigidity of the arm portion 12c can be set to be optimal by formation of the first lightening hole 12*h*, the second lightening hole 12*j* and the third lightening hole 12*p* to the arm portion 12*c*.

Further, as illustrated in FIGS. 4, 5A and 5B, the reflector 141 is provided in the recessed portion 12*f* formed in the outer side surface 12*e* of the arm portion 12*c*, so that the protruded amount by which the reflector 141 protrudes from the outer side surface 12*e* of the front swing arm 12 can be restrained, and air resistance can be decreased.

Further, as illustrated in FIG. 4, the cover member is the reflector 141 that reflects light from the vehicle side part, the reflector 141 has the shape along the external shape of the arm portion 12*c*, at least a part of the reflector 141 overlaps the brake disk 64*a* attached to the front wheel 13 and overlaps the wheel 13*b* included in the front wheel 13 in side view, so that the reflector 141 can be formed to be large so as to be along the external shape of the arm portion 12*c*, and visibility of the reflector 141 can be enhanced.

Further, as illustrated in FIGS. 5A and 5B, the front swing arm 12 integrally includes the caliper support portion 12*q* that supports the brake caliper 64*b* that sandwiches the brake disk 64*a* to brake, the lightening holes are the first lightening hole 12*h* provided in the upper portion of the recessed portion 12*f*, and the second lightening hole 12*j* that is provided in the recessed portion 12*f* and is provided at the substantially same height as the upper end 12*r* of the caliper support portion 12*q*, so that by providing a plurality of lightening holes, the front swing arm 12 can be made lighter, and the unsprung weight can be made lighter. Further, the second lightening hole 12*j* is provided in the vicinity of the caliper support portion 12*q*, so that rigidity balance of the front swing arm 12 can be set properly.

Further, as illustrated in FIGS. 4 and 7, at the edge of the first lightening hole 12*h*, the reflector support portion 12*k* that supports the reflector 141 is provided, the third lightening hole 12*p* that is the lightening hole is provided in the inner side surface 12*n* of the arm portion 12*c*, the rubber plug 146 as the rubber member is fitted in the third lightening hole 12*p*, and the first lightening hole 12*h* and the reflector support portion 12*k* overlap the third lightening hole 12*p* in side view, so that by providing the third lightening hole 12*p*, the front swing arm 12 can be made much lighter, and the unsprung weight can be made much lighter. Further, since the first lightening hole 12*h* and the reflector support portion 12*k* overlap the third lightening hole 12*p* in the vehicle width direction, so that attaching and detaching work at the time of attaching or detaching the reflector 141 with respect to the reflector support portion 12*k* can be easily performed through the third lightening hole 12*p*. Further, the reflector support portion 12*k* can be protected by the rubber plug 146 from the inside in the vehicle width direction.

Further, the third lightening hole 12*p* has the opening area formed to be larger than the first lightening hole 12*h*, so that the attaching and detaching work of the reflector 141 with respect to the reflector support portion 12*k* (work of attaching or detaching the reflector 141 with the screw portion 143 and the nut 144 with respect to the reflector support portion 12*k*) can be easily performed, and workability can be enhanced.

Further, as illustrated in FIGS. 4 and 8, the second lightening hole 12*j*, the reflector positioning hole 12*m* formed in the bottom surface 12*g* of the recessed portion 12*f* to position the reflector 141, and the reflector attaching hole 12*s* formed to attach the reflector 141 to the reflector support portion 12*k* are disposed in the straight line 152 in side view, so that the second lightening hole 12*j*, the reflector positioning hole 12*m* and the reflector attaching hole 12*s* can be easily worked by rectilinearly sliding a head with a processing machine equipped with the head capable of switching a plurality of boring tools differing in outside diameter, for example.

Further, as illustrated in FIG. 4, the third lightening hole 12*p* is formed into an elliptical shape in which the long axis 140 is provided to be along the longitudinal direction of the arm portion 12*c*, so that a hand and a tool can be easily inserted into the third lightening hole 12*p*, attaching and detaching work of the reflector 141 can be easily performed, and therefore workability can be enhanced.

The aforementioned embodiments illustrate only one mode of the present invention, and modifications and applications can be made arbitrarily within the range without departing from the gist of the present invention.

For example, in the above described embodiments, as illustrated in FIG. 4, the third lightening hole 12*p* is formed into an elliptical shape, but the third lightening hole 12*p* is not limited to this, and may be in a rectangular, circular, triangular, rhombic, parallelogrammatic, or oval shape, or a shape close to these shapes, and a shape of combination of these shapes. Further, the longitudinal direction of the third lightening hole 12*p* is caused to be along the longitudinal direction of the front swing arm 12, but the longitudinal direction of the third lightening hole 12*p* may be inclined or orthogonal with respect to the longitudinal direction of the front swing arm 12, without being limited to this.

Further, as illustrated in FIG. 7, the reflector 141 is attached to the reflector support portion 12*k* with the screw portion 143 and the nut 144, but the reflector 141 may be fixed by engaging a fastener such as a clip provided on the back surface of the reflector 141 with the reflector attaching hole 12*s* of the reflector support portion 12*k*. Alternatively, the reflector 141 may be pasted on the bottom surface 12*g* of the recessed portion 12*f* by an adhesive or the like.

Further, the rubber plug 146 is fitted in the third lightening hole 12*p*, but the present invention is not limited to this, and a resin cap may be directly fitted in the third lightening hole 12*p*, or a resin cap may be fitted in the third lightening hole 12*p* via a sealing gasket.

The present invention is not limited to the case of being applied to the motorcycle 10, but may be applicable to saddled vehicles including other vehicles than the motorcycle 10. Note that the saddled vehicles are vehicles including all the vehicles on which people ride across the vehicle bodies, and include not only motorcycles (also including motorized bicycles), but also tricycle vehicles and four-wheeled vehicles classified into ATV (all-terrain vehicle).

REFERENCE SIGNS LIST

10 Motorcycle (saddled vehicle)
12 Front fork (front swing arm)
12*a* Front wheel steering shaft
12*c* Arm portion
12*d* Bridge portion
12*f* Recessed portion
12*h* First lightening hole (lightening hole)
12*j* Second lightening hole (lightening hole)
12*k* Reflector support portion
12*m* Reflector positioning hole
12*p* Third lightening hole (lightening hole)
12*q* Caliper support portion
12*s* Reflector attaching hole
13 Front wheel
13*b* Wheel 21 Handle
61 Handle steering shaft
62 Main frame
64*a* Brake disk
64*b* Brake caliper
66 Upper link (link member)
67 Lower link (link member)
68 Fork support portion
69 Front cushion unit (shock absorber)
140 Long axis of third lightening hole
141 Reflector (cover member)
146 Rubber plug (rubber member)
152 straight line

The invention claimed is:

1. A front fork for a saddled vehicle, comprising a handle steering shaft that is operated by a handle, a main frame that rotatably supports the handle steering shaft, a front wheel steering shaft that is disposed in front of the handle steering shaft and steers a front wheel, a fork support portion that rotatably supports the front wheel steering shaft, link members that swingably connect the respective main frame and fork support portion, and a shock absorber that is laid on the main frame and a respective one of the link members, and including the front wheel steering shaft at an upper portion while pivotally supporting the front wheel at a lower end portion,
   wherein the front fork comprises left and right arm portions, and a bridge portion integrally connecting the left and right arm portions, and
   lightening holes are provided in the respective arm portions, the lightening holes are covered with a cover member that is provided to be exposed to an outer side surface of the respective arm portion, from outside,
   wherein a recessed portion is formed in the outer side surface of the respective arm portion, and
   wherein the front fork integrally includes a caliper support portion that supports a brake caliper that sandwiches a brake disk attached to the front wheel in side view, to brake, and the lightening holes include a first lightening hole provided in an upper portion of the recessed portion and a second lightening hole that is provided in the recessed portion at a substantially same height as an upper end of the caliper support portion.

2. The front fork for a saddled vehicle according to claim 1, wherein at an edge of the first lightening hole, a reflector support portion that supports the reflector is provided, and wherein the lightening holes further include a third lightening hole that is provided in an inner side surface of the respective arm portion, a rubber member is fitted in the third lightening hole, and the first lightening hole and the reflector support portion overlap the third lightening hole in side view.

3. The front fork for a saddled vehicle according to claim 2, wherein the third lightening hole has an opening area formed to be larger than the first lightening hole.

4. The front fork for a saddled vehicle according to claim 2, wherein the second lightening hole, a reflector positioning hole formed in a bottom surface of the recessed portion to position the reflector, and a reflector attaching hole formed to attach the reflector to the reflector support portion are disposed in a straight line in side view.

5. The front fork for a saddled vehicle according to claim 2, wherein the third lightening hole is formed into an elliptical shape in which a long axis is provided to be along a longitudinal direction of the respective arm portion.

6. The front fork for a saddled vehicle according to claim 1, wherein the cover member is provided in the recessed portion.

7. The front fork for a saddled vehicle according to claim 6, wherein the cover member is a reflector that reflects light from a vehicle side part, the reflector has a shape along an external shape of the respective arm portion, at least a part of the reflector overlaps the brake disk and overlaps a wheel included in the front wheel in side view.

\* \* \* \* \*